United States Patent
Dillon

Patent Number: 6,092,746
Date of Patent: Jul. 25, 2000

[54] PORTABLE PARTICULATE SPREADER

[76] Inventor: Patrick Dillon, 172 River Dr., Lake Hiawatha, N.J. 07034

[21] Appl. No.: 09/273,456

[22] Filed: Mar. 22, 1999

[51] Int. Cl.[7] .............................. A01C 17/00; A62C 15/00
[52] U.S. Cl. ........................ 239/683; 239/142; 239/152; 239/154; 239/652; 239/653; 239/681; 239/686; 239/689
[58] Field of Search ................................... 239/152, 154, 239/142, 302, 374, 375, 379, 650, 652, 653, 664, 680, 681, 682, 683, 686, 689; 222/175; D8/2

[56] References Cited

U.S. PATENT DOCUMENTS

| | | | |
|---|---|---|---|
| 95,241 | 9/1869 | Lewis | 239/652 |
| 160,733 | 3/1875 | Walker | 239/652 |
| 1,551,877 | 9/1925 | Henning | 239/653 |
| 2,707,068 | 4/1955 | Williamson | 239/652 X |
| 3,220,954 | 11/1965 | Malbe | 239/689 X |
| 3,993,225 | 11/1976 | Manni | 239/653 X |
| 4,678,377 | 7/1987 | Bouchard . | |
| 5,119,993 | 6/1992 | Gunzel, Jr. et al. . | |
| 5,123,598 | 6/1992 | Cortney et al. . | |
| 5,409,166 | 4/1995 | Gunzel, Jr. et al. . | |

*Primary Examiner*—Andres Kashnikow
*Assistant Examiner*—Robin O. Evans
*Attorney, Agent, or Firm*—Terrance L. Siemens

[57] ABSTRACT

A portable particulate spreader comprising a container having a closed end, an open end and a storage chamber for holding particulate materials therein. A first strap handle is affixed to a side of the container adjacent the closed end. A second strap handle is pivotally affixed to same side of the container approximately midway between closed end and open end, so that a person can grasp the strap handles with both hands and toss particulate materials out of open end. The container further includes an agitation assembly for automatically agitating particulate materials within the container, so as to prevent particulate materials from sticking together. A dispensing assembly is for automatically dispensing particulate materials out of open end of the container.

5 Claims, 2 Drawing Sheets

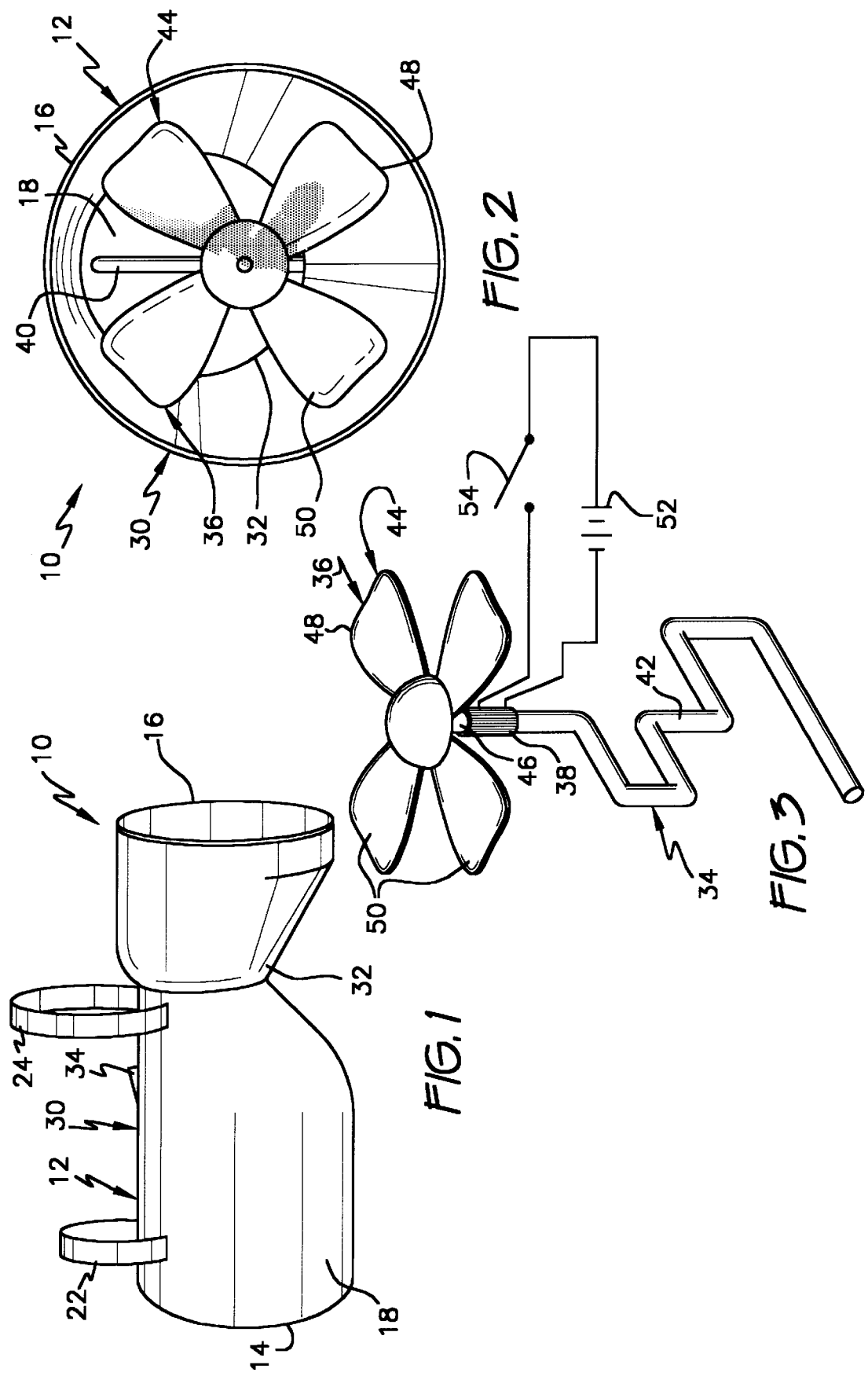

PORTABLE PARTICULATE SPREADER

BACKGROUND OF THE INVENTION

1. Field of the Invention

The present invention relates generally to dispensing devices. More particularly, the invention comprises a portable particulate spreader.

In general, a first field of use of the disclosed invention is by homeowners as the most likely benefactors of the unique advantages of the instant invention. However, many other fields, such as by industrial building maintenance personal, could find potentially beneficial uses of this invention.

Thus, it can be seen that the potential fields of use for this invention are myriad and the particular preferred embodiments described herein is in no way meant to limit the use of the invention to the particular field chosen for exposition of the details of the invention.

A comprehensive listing of all the possible fields to which this invention may be applied is limited only by the imagination and is, therefore, not provided herein. Some of the more obvious applications are mentioned in the interest of providing a full and complete disclosure of the unique properties of this previously unknown general purpose article of manufacture. It is to be understood from the outset that the scope of this invention is not limited to these fields or to the specific examples of potential uses presented herein.

2. Description of the Prior Art

Attempts have been made in the prior art to devise dispensing devices. These dispensing devices are used to distribute small particles therefrom. The dispensing devices are held by hand of a user, thereby allowing the user to operate and transport the dispensing devices thereabout.

Dispensing devices are shown in U.S. Pat. No. 4,678,377, issued to Antoine J. Bouchard on Jul. 7, 1987, U.S. Pat. No. 5,119,993, issued to Rudolph M. Gunzel, Jr., et al. on Jun. 9, 1992, U.S. Pat. No. 5,123,598, issued to Steve P. Cortney, et al. on Jun. 23, 1992 and U.S. Pat. No. 5,409,166, issued to Rudolph M. Gunzel, Jr., et al. on Apr. 25, 1995.

U.S. Pat. No. 4,678,377 to Bouchard discloses a dispenser for particulate matter. Powder is placed in a pouch in which a gaseous stream flows. Squeezing the pouch results in controlling the amount of powder entrained in the gaseous stream. The pouch is supported with its outlet opening downstream its inlet opening to provide a direct flow path through the pouch. The present invention is completely different than this patent, in that it consists of a venturi shaped container having a pair of strap handles, so that a person can grasp the strap handles with both hands and toss particulate materials therefrom. The container can also include a built-in motorized agitator and impeller to help eject the particulate materials therefrom.

U.S. Pat. No. 5,119,993 to Gunzel, Jr., et al. Discloses a portable particulate material spreader. The spreader has two main parts: a container portion which holds particulate matter and a dispensing portion, which includes a blower mechanism, a drive mechanism, an energy supply and a handle. The present invention is completely different than this patent, in that it consists of a venturi shaped container having a pair of strap handles, so that a person can grasp the strap handles with both hands and toss particulate materials therefrom. The container can also include a built-in motorized agitator and impeller to help eject the particulate materials therefrom.

U.S. Pat. No. 5,123,598 to Courtney, et al. Discloses a portable spreading device. The device includes a housing having a storage chamber affixed to a manually engageable pistol grip-type handle. The storage chamber is positioned over an impeller and includes a port for gravitational flow of material therefrom onto the impeller. The impeller is horizontally disposed to rotate in order to spread material deposited thereon in a direction lateral to and longitudinally forward of the device. The present invention is completely different than this patent, in that it consists of a venturi shaped container having a pair of strap handles, so that a person can grasp the strap handles with both hands and toss particulate materials therefrom. The container can also include a built-in motorized agitator and impeller to help eject the particulate materials therefrom.

U.S. Pat. No. 5,409,166 to Gunzel, Jr., et al. Discloses a battery powered particulate spreader. A housing is provided with an inlet and an outlet. A reservoir for holding particulate material is located above the housing. A blower is located within a flow path extending from the inlet to the outlet. A particulate intake port is in a channel wall which encompasses an exhaust channel extending downstream from the blower to the outlet. A valve controls flow of particulate material from the reservoir to the particulate intake port. An agitator reciprocates rotationally to improve flow of material from the reservoir. A control mechanism provides a delay between starting of the blower and the opening of the valve and a delay between the closing of the valve and the turning off of the blower. The present invention is completely different than this patent, in that it consists of a venturi shaped container having a pair of strap handles, so that a person can grasp the strap handles with both hands and toss particulate materials therefrom. The container can also include a built-in motorized agitator and impeller to help eject the particulate materials therefrom.

None of the above inventions and patents, taken either singly or in combination, is seen to describe the instant invention as claimed.

SUMMARY OF THE INVENTION

The present invention is a portable particulate spreader that consists of a venturi shaped container having a pair of strap handles, so that a person can grasp the strap handles with both hands and toss particulate materials therefrom. The container can also include a built-in motorized agitator and impeller to help eject the particulate materials therefrom.

Accordingly, it is a principal object of the invention to provide a portable particulate spreader that will overcome the shortcomings of the prior art devices.

Another object of the invention is to provide a portable particulate spreader that will quickly dispense the particulate materials therefrom, over large areas more evenly, thus enabling a person to use the spreader much more efficiently.

An additional object of the invention is to provide a portable particulate spreader in which industrial building maintenance personal can use the spreader to reduce the cost of their maintenance budgets when salting areas about buildings.

A further object of the invention is to provide a portable particulate spreader that is simple and easy to use.

A still further object of the invention is to provide a portable particulate spreader that is economical to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a side perspective view of the present invention.

FIG. 2 is an enlarged end view taken in the direction of arrow 2 in FIG. 1.

FIG. 3 is a perspective view showing various components of the agitation assembly and dispensing assembly.

DETAILED DESCRIPTION OF THE PREFERRED EMBODIMENTS

Figure 4:
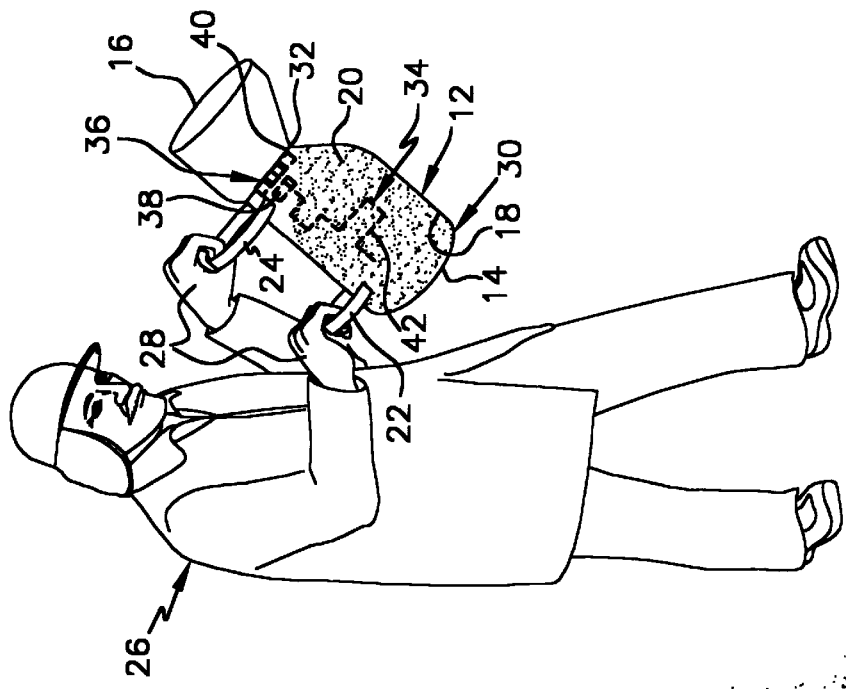
FIG. 4 is a perspective view showing a person holding the present invention in a generally vertical position.
Figure 5:
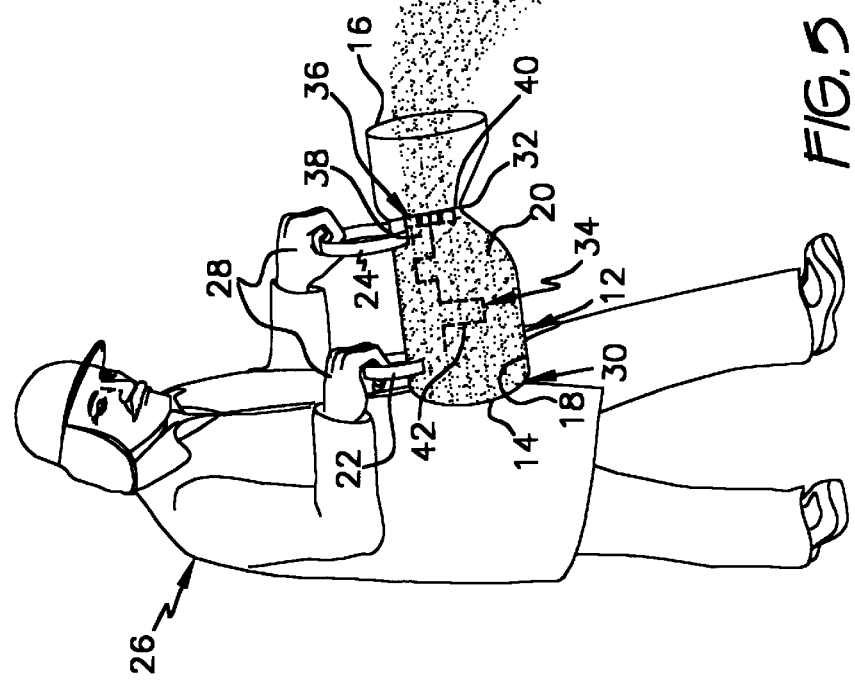
FIG. 5 is a perspective view showing the person holding the present invention in a generally horizontal position dispensing the particulate material therefrom.

Turning now descriptively to the drawings, in which similar reference characters denote similar elements throughout the several views, FIGS. 1 through 5 illustrate the present invention being a portable particulate spreader 10, comprising a container 12 having a closed end 14, an open end 16 and a storage chamber 18 for holding particulate materials 20 therein. A first strap handle 22 is affixed to a side of container 12 adjacent closed end 14. A second strap handle 24 is pivotally affixed to same side of container 12 approximately midway between closed end 14 and open end 16, so that a person 26 can grasp strap handles 22, 24 with both hands 28 and toss particulate materials 20 out of open end 16.

The container 12 further includes a cylindrical body 30 having a venturi shaped constricted throat 32. An agitation assembly 34 is for automatically agitating the particulate materials 20 within container 12, so as to prevent the particulate materials 20 from sticking together. A dispensing assembly 36 is for automatically dispensing the particulate materials 20 out of open end 16 of container 12 (see FIG. 3).

Agitation assembly 34 consists of an electric motor 38. A bracket 40 is for mounting electric motor 38 centrally within container 12. A crankshaft shaped pipe 42 extends from a first end of electric motor 38 into particulate materials 20 within container 12, so that when electric motor 38 is turned on crankshaft shaped pipe 42 will rotate and stir up the particulate materials 20.

Dispensing assembly 36 comprises an impeller 44 on a second end of electric motor 38 opposite from crankshaft shaped pipe 42, so that when electric motor 38 is turned on, impeller 44 will rotate and eject particulate materials 20 out of open end 16 of container 12. Impeller 44 includes a shaft 46 extending from electric motor 38. A propeller 48 having radiating blades 50 is mounted on shaft 46. Battery 52 is electrically connected to electric motor 38. A switch 54 is mounted on container 16 and is electrically connected between electric motor 38 and battery 52.

To use portable particulate spreader 10 the person 26 simply places particulate materials 20 into storage chamber 18 of container 12. Strap handles 22, 24 are then grasped by both hands 28 of the person 26 to toss particulate materials 20 out of open end 16. If switch 54 is turned on both the agitation assembly 34 and the dispensing assembly 36 will operate to stir up and eject the particulate materials 20 out of open end 16.

It is to be understood that the present invention is not limited to the embodiments described above, but encompasses any and all embodiments within the scope of the following claims.

I claim:

1. A portable particulate spreader comprising:

a container having a closed end, an open end and a storage chamber for holding particulate materials therein;

a first strap handle affixed to a side of said container adjacent said closed end;

a second strap handle pivotally affixed to same side of said container approximately midway between said closed end and said open end, so that a person can grasp said strap handles with both hands and toss said particulate materials out of said open end;

a dispensing means for automatically dispensing said particulate materials out of said open end of said container; and an agitation means for automatically agitating said particulate materials within said container, so as to prevent said particulate materials from sticking together; wherein said agitation means includes;

an electric motor, a bracket for mounting said electric motor centrally within said container, and a crankshaft shaped pipe extending from a first end of said electric motor into said particulate materials within said container, so that when said electric motor is turned on said crankshaft shaped pipe will rotate and stir up said particulate materials.

2. A portable particulate spreader as recited in claim 1, wherein said container further includes a cylindrical body having a venturi shaped constricted throat.

3. A portable particulate spreader as recited in claim 1, wherein said dispensing means includes:

an impeller on a second end of said electric motor opposite from said crankshaft shaped pipe, so that when said electric motor is turned on, said impeller will rotate and eject said particulate materials out of said open end of said container.

4. A portable particulate spreader as recited in claim 3, wherein said impeller includes:

a shaft extending from said electric motor; and a propeller having radiating blades mounted on said shaft.

5. A portable particulate spreader as recited in claim 1, further including:

a battery electrically connected to said electric motor; and a switch mounted on said container and electrically connected between said electric motor and said battery.

* * * * *